(12) United States Patent
Wang et al.

(10) Patent No.: US 7,376,291 B1
(45) Date of Patent: May 20, 2008

(54) FREE SPACE OPTICAL ISOLATOR WITH STACKED PARALLEL POLARIZERS

(75) Inventors: Steve Wang, San Jose, CA (US); Mingkun Shi, Pleasanton, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/702,523

(22) Filed: Nov. 6, 2003

Related U.S. Application Data

(60) Provisional application No. 60/424,614, filed on Nov. 6, 2002.

(51) Int. Cl.
*G02B 6/00* (2006.01)

(52) U.S. Cl. ................... 385/11; 359/246; 359/245; 359/238

(58) Field of Classification Search ........... 359/280, 359/483, 494, 497; 349/117; 372/703; 385/11
See application file for complete search history.

(56) References Cited

U.S. PATENT DOCUMENTS

| | | | |
|---|---|---|---|
| 4,770,505 A | | 9/1988 | Okazaki |
| 5,128,956 A | * | 7/1992 | Aoki et al. ................ 372/43 |
| 5,375,009 A | | 12/1994 | Otani et al. |
| 5,517,356 A | | 5/1996 | Araujo et al. |
| 5,774,264 A | * | 6/1998 | Konno et al. ............ 359/497 |
| 5,818,981 A | * | 10/1998 | Pan et al. ................ 385/11 |
| 5,999,315 A | * | 12/1999 | Fukano et al. ........... 359/492 |
| 6,175,668 B1 | | 1/2001 | Borrelli et al. |
| 6,275,336 B1 | * | 8/2001 | Yoshikawa et al. ....... 359/484 |
| 6,331,991 B1 | * | 12/2001 | Mahgerefteh .............. 372/33 |
| 6,375,870 B1 | * | 4/2002 | Visovsky et al. ......... 264/1.31 |
| 6,388,730 B1 | | 5/2002 | Lindquist |
| 6,483,645 B1 | * | 11/2002 | Tanno et al. ............. 359/484 |
| 6,535,655 B1 | | 3/2003 | Hasui et al. |
| 6,535,656 B1 | | 3/2003 | Noge et al. |
| 6,577,779 B2 | * | 6/2003 | Watanabe ................ 385/11 |
| 6,590,695 B1 | * | 7/2003 | Kurtz et al. ............. 359/291 |
| 6,606,885 B2 | | 8/2003 | Harris et al. |
| 6,654,168 B1 | | 11/2003 | Borrelli et al. |
| 6,766,082 B2 | * | 7/2004 | Hirabayashi et al. ....... 385/40 |
| 6,813,077 B2 | * | 11/2004 | Borrelli et al. ........... 359/486 |
| 2002/0005987 A1 | * | 1/2002 | Wills et al. ............. 359/497 |
| 2002/0048061 A1 | * | 4/2002 | Glingener et al. ........ 359/110 |
| 2002/0191880 A1 | * | 12/2002 | Borrelli et al. ............ 385/11 |
| 2003/0012517 A1 | * | 1/2003 | Yu et al. ................. 385/73 |
| 2003/0174397 A1 | * | 9/2003 | Sugawara et al. ........ 359/484 |
| 2004/0032663 A1 | * | 2/2004 | TeKolste ................ 359/618 |

OTHER PUBLICATIONS

Infrared Polarizers—Theory and Applications, Pike Technologies.*

* cited by examiner

*Primary Examiner*—Frank G. Font
*Assistant Examiner*—Erin D. Chiem
(74) *Attorney, Agent, or Firm*—Workman Nydegger

(57) ABSTRACT

The present invention provides low cost methods and apparatuses for filtering out polarized light reflections in a free space optical isolator. Multiple polarizers having relatively poor extinction ratios can be stacked together as polarizer assemblies having higher extinction ratios than possible with the individual components. One or more polarizer assemblies may then be used in series with an optical signal generator, an optical signal rotator, one or more other polarizers or polarizer assemblies, and a fiber optic receptacle to isolate an optical signal in a transmitter optical subassembly. Accordingly, the present invention can polarize an optical signal more efficiently than with prior methods, doing so at a relatively high perpendicular beam extinction ratio with a much lower cost.

13 Claims, 4 Drawing Sheets

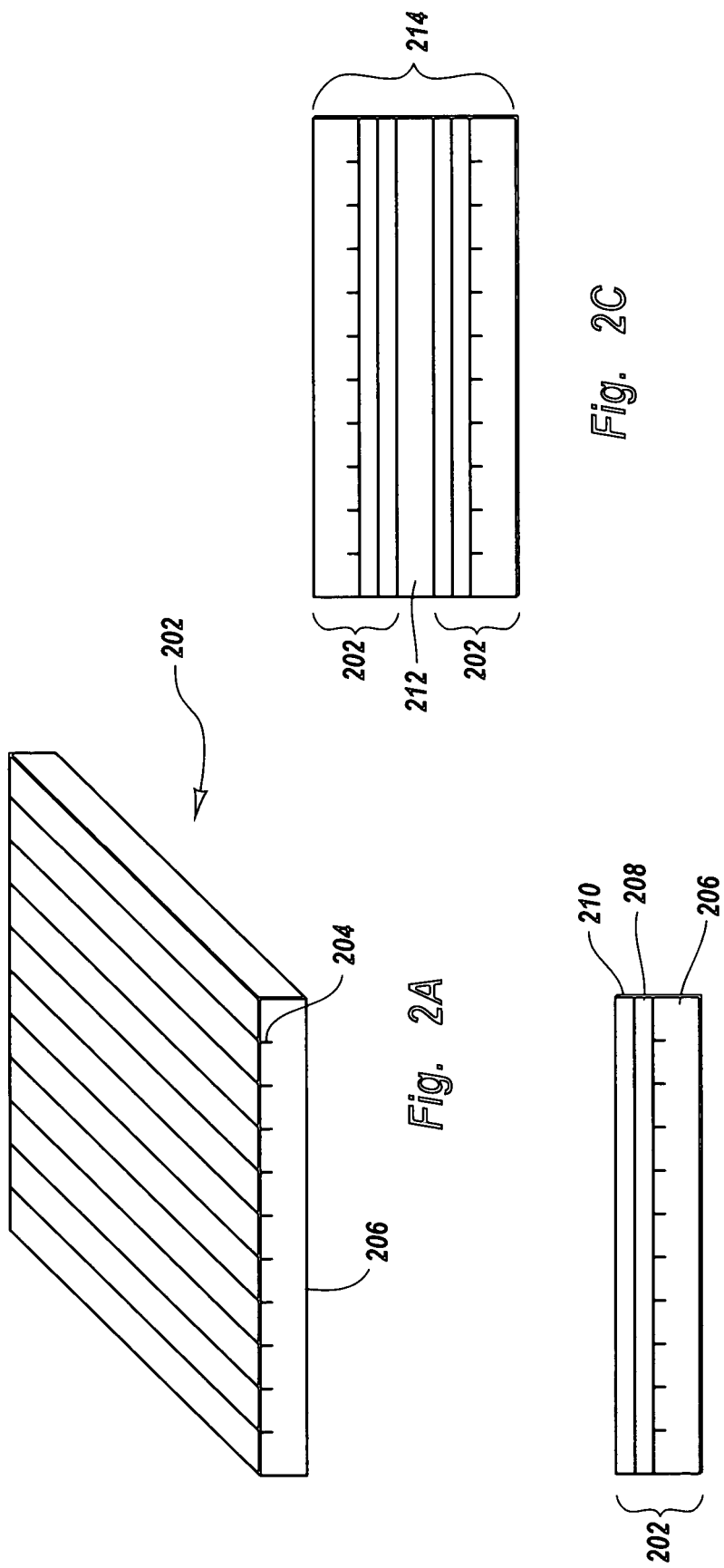

FREE SPACE OPTICAL ISOLATOR WITH STACKED PARALLEL POLARIZERS

RELATED INFORMATION

This application claims the benefit of priority to U.S. Provisional Application No. 60/424,614, filed on Nov. 6, 2002, the disclosure of which is incorporated herein by reference.

BACKGROUND OF THE INVENTION

1. The Field of the Invention

Embodiments of the present invention relate to methods and apparatus for reducing back reflections into the source laser in a fiber-optic network.

2. Description of the Related Art

In the field of data transmission, one method of efficiently transporting data is through the use of fiber-optics. Digital data is propagated through a fiber-optic cable using light-emitting diodes or lasers. Light signals allow for extremely high transmission rates and very high bandwidth capabilities. Also, light signals are resistant to electromagnetic interferences that would otherwise interfere with electrical signals. Light signals are more secure because they do not allow portions of the signal to escape from the fiber-optic cable as can occur with electrical signals in wire-based systems. Light also can be conducted over greater distances without the signal loss typically associated with electrical signals on copper wire.

One goal in modern fiber-optic communication configurations is to maintain the integrity of the signal generated by the laser or the light emitting diode. One common problem that degrades the integrity of the signal generated occurs when portions of the signal are reflected back into the laser. Such reflections can cause increased transmission noise or bit error rates, increased laser noise due to reflections that cause optical resonance in the laser, and other similar problems.

One cause of this type of signal reflection occurs when the laser beam signal leaves a medium having a first index of refraction, and then enters a medium having a second and different index of refraction. For example, when a Distributed Feedback (DFB) laser is interfaced with a fiber-optic pigtail with free space between the laser and the receiving end of the pigtail, reflections often occur. Reflections of the laser beam back into the laser (or similar light source) are commonly referred to as "back reflections."

Back reflections are commonly measured in terms of a ratio of the amount of the laser beam that is reflected compared to the transmitted part of the laser beam. This value is commonly expressed as a logarithmic ratio. In terms of this logarithmic ratio, DFB lasers commonly require back reflection levels as low as −40 dB to operate properly. One specific type of reflection that needs attention is "near-end back reflection." A near-end back reflection is one caused by the first one or two connections from a laser transceiver to a fiber-optic pigtail and to a communications panel. Because these first connections generally occur in a fiber-optic cable that is not subjected to bending and heat stresses, the state of polarization of the laser beam can be predicted fairly accurately.

One example of a method for controlling near-end back reflections is shown in FIG. 1, which generally shows a Transmitter Optical Subassembly (TOSA) designated generally as 100. The TOSA 100 has a DFB laser 102 coupled to an optical isolator 104. The optical isolator 104 includes a 0° polarizer 106 coupled to a Faraday rotator 108, which is in turn coupled to a 45° polarizer 110. The DFB laser 102 emits a beam 114 which may be of any polarization as illustrated by the polarization indicator 112. The beam 114 passes through the 0° polarizer 106, which allows only the portions of the beam polarized at 0° to pass through, causing the beam 114 to be polarized at 0° as shown by the polarization indicator 116.

The beam 114 then passes through the Faraday rotator 108, which, in this example, is designed to rotate the beam 114 by 45° in the positive direction. The Faraday rotator 108 may be formed from a latching magnetic material or non-latching magnetic material. For a non-latching material, an external magnet 109 may be used to apply a magnetic field, while a latching material does not need an external magnetic field. This rotation causes the beam 114 to be polarized at 45° as is shown by the polarization indicator 118.

The beam 114 then passes through the 45° polarizer 110 without disruption as the optical axis of the 45° polarizer 110 and the polarization of the beam 114 are aligned. The beam 114 remains polarized at 45° as is shown by the polarization indicator 120. The beam 114 is then propagated through an air space 122 into a fiber-optic pigtail 124. While shown as a single discrete fiber-optic component, the fiber-optic pigtail actually represents all of the various connections that may exist in a fiber-optic network that cause back reflections including pigtail, transceiver, communication panel, and other connections.

Due to the difference in the index of refraction of the fiber-optic pigtail 124 (for example, about 1.47) and the air space 122 (about 1.0) at various connections within the network, a reflected beam 126 is often propagated back towards the DFB laser 102. The reflected beam 126 (or back reflection) may have any state of polarization (as shown by the polarization indicator 128), since the reflected beam 126 is caused by various components within the network. However, a major part of the reflected beam 126 is the near-end reflection caused by the first few components into which the beam 114 is transmitted. If these components are not subjected to mechanical and thermal stress, these near-end portions of the reflected beam are typically polarized at approximately 45°.

The reflected beam 126 passes through the 45° polarizer 110 such that only the portions of the reflected beam 126 that are polarized at 45° are allowed to pass through. This causes the reflected beam 126 to be polarized at 45° as shown by the polarization indicator 130. The reflected beam 126 then passes through the Faraday rotator 108, where it is rotated by positive 45° such that it is polarized to 90° as shown by the polarization indicator 132. Note that the Faraday rotator 108 rotates all beams passing through the Faraday rotator 108 by positive 45° irrespective of the direction of travel. The reflected beam 126 polarized at 90° has no 0° components and is therefore totally rejected from passing through the 0° polarizer 106. In this way, back reflections into the DFB laser 102 are minimized.

While in theory this method appears to completely block any back reflections into the DFB laser 102, in practice this often may not be the result. An ideal polarizer only allows beams to pass through at the angle of polarization of the polarizer. However, actual polarizers allow small portions of the beam perpendicular to the angle of polarization to leak through (referred to as leakage). One characteristic that determines the quality and often the price of a polarizer is the polarizer's ability to minimize the leakage of perpendicular polarization components of beams passing through the polarizer. This characteristic is known as the polarizer's "extinction ratio."

Commonly, conventional polarizers used in the TOSA 100 environment described above have a perpendicular beam extinction ratio (or simply "extinction ratio") of about −40 to −45 dB. One such polarizer is known as a pulled-glass polarizer. While using such polarizers effectively meets the operating criteria for most DFB lasers, such polarizers can be relatively expensive. In fact, the polarizers represent as much as 70% of the total isolator cost, and thus can significantly increase the overall relative cost of the isolator component. It would therefore be beneficial to construct an optical isolator using polarizers that are less expensive, thereby reducing the overall cost of the optical component.

SUMMARY OF AN EXAMPLE EMBODIMENT

Embodiments of the present invention provides solutions to the problems existing in the prior art by implementing multiple low-cost polarizers manufactured to be used together in series in a free space optical transmitter. Specifically, one embodiment uses low-cost polarizer assemblies in conjunction with a distributed feedback laser and a Faraday rotator. One polarizer assembly may be an assembly of two or more low-grade 0° polarizers treated with an anti-reflective coating. Another of the polarizer assemblies may be an assembly of two or more low-grade 45° polarizers, also treated with an anti-reflective coating. Each polarizer assembly includes polarizing materials of the same polarization.

Since the optical transmitter uses low-cost polarizer materials, the approach provides significant cost savings over prior art optical transmitters using higher grade polarizer materials, even though the present approach uses multiple low-cost polarizer materials. In addition, the use of multiple low-cost polarizers provides additive effect to each polarizer assembly's perpendicular beam extinction ratio, thus benefiting both signal isolation, and the prevention of signal back reflection. Thus, disclosed embodiments provide greater optical signal isolation efficiency (i.e., much greater filtration of back reflection, or higher extinction ratios) than prior art optical transmitters that use more expensive polarizers.

BRIEF DESCRIPTION OF THE DRAWINGS

In order that the manner in which advantages and features of the invention are obtained, a description of the invention will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 2A, 2B, 2C, 2D and 2E together illustrate the structural details of one example of an efficient polarizer.

DETAILED DESCRIPTION OF AN EXAMPLE EMBODIMENT

As noted above, pulled-glass polarizers are typically used in conventional optical isolators. An alternate type of polarizer is known as a ruled-glass polarizer. Ruled-glass polarizers are much more cost-effective than pulled-glass polarizers. However, ruled-glass polarizers are not as efficient as pulled-glass polarizers. For example the perpendicular beam extinction ratio (or "extinction ratio") for ruled-glass polarizers is in the range of −30 to −35 dB. As will be shown in the disclosed example, by using multiple ruled-glass polarizers in series, high extinction ratios can be attained while maintaining a high level of cost-effectiveness.

Figure 2E:
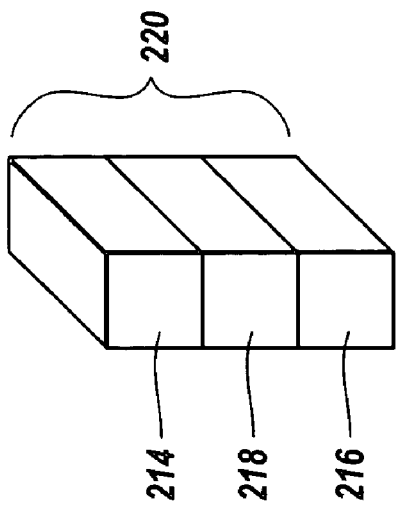

Referring now to FIGS. 2A, 2B, 2C, 2D and 2E, aspects of one example of implementation of the present invention are illustrated. FIG. 2A shows a ruled-glass polarizer designated generally as polarizer 202. Here, the polarizer 202 is implemented as a polarizer assembly, where the assembly includes two or more lower-cost polarizers assembled together in series. To fabricate the polarizer assembly, a manufacturer first creates a first ruled-glass polarizer 202 by embedding a series of parallel metal wires in grooves 204, the grooves being preformed on a glass substrate portion 206.

As is illustrated in FIG. 2B, using this exemplary approach, the manufacturer then covers the initial glass substrate 206 with another layer 208 of the same type of glass in a manner so that the initial glass substrate 206 and added layer of glass 208 fuse together. After fusing the initial glass substrate 206 and the added layer of glass 208, the manufacturer adds an anti-reflective coating 210 for use with epoxy adhesive materials. The anti-reflective coating 210 over the layer of glass 208 minimizes internal reflection caused by the application of epoxy adhesive to the polarizer. The manufacturer follows the same process to create at least a second identical polarizer (e.g., 202) with a glass substrate (e.g., 206), an added glass layer (e.g., 208), and an anti-reflective coating (e.g., 210).

The manufacturer then creates a polarizer assembly 214, by combining the two polarizers so that the two polarizers have parallel directions of polarization, as shown in FIG. 2C. To combine the polarizers, the manufacturer can add a layer of low stress epoxy 212 between the two polarizers 202. In preferred embodiments, the epoxy is an ultraviolet curing epoxy that can be further heat-cured. The dual polarizer assembly 214 is then lapped with a standard solution on the top and bottom sides, which polishes the assembly 214 to an appropriate optical quality. The face of the dual polarizer assembly that is exposed to air is coated with an anti-reflective coating to create an efficient interface between the air and the polarizer.

The effective extinction ratio of the dual polarizer assembly 214 is the result of the multiplication of the extinction ratios of the individual polarizers. Noting that the extinction ratio is expressed as a logarithmic ratio, this multiplication can be accomplished by adding the logarithmic ratios of the two polarizers. Thus, for example, if each polarizer 202 has a −30 dB extinction ratio, the combination of two identical polarizers 214 has a −60 dB extinction ratio. This additive property in extinction ratios allows the ruled-glass polarizers 202 to be relatively inexpensive compared to those that would otherwise be required if a single polarizer were to be used to achieve a similar extinction ratio. One way the individual glass ruled polarizers 202 can be less expensive is by using glass that meets less rigid tolerances and other manufacturing specifications compared with those that would be required in the absence of the invention. As a result, the optical isolators that are fabricated according to the invention are less expensive than conventional optical isolators.

Figure 2D:
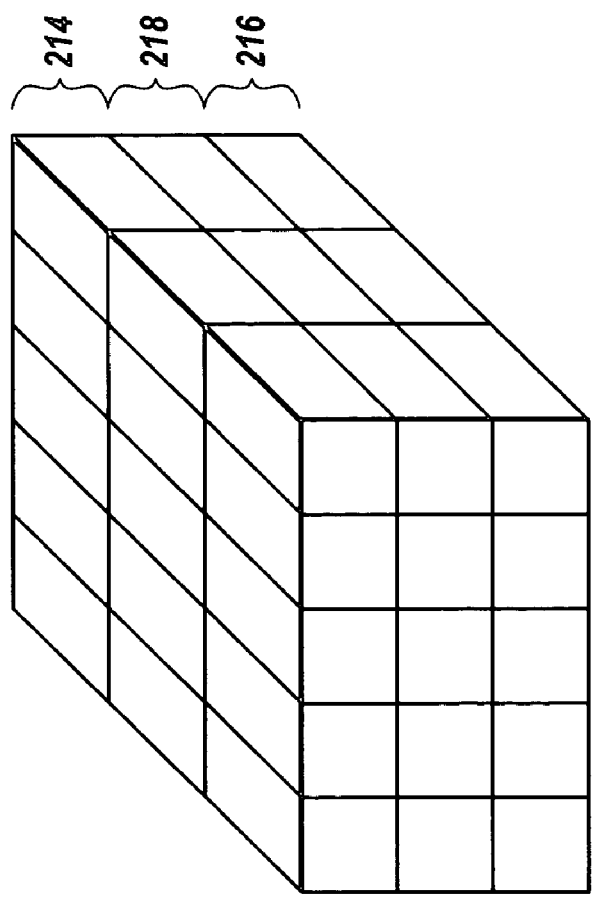

In the illustrated example, to assemble the optical isolator a first dual polarizer assembly 214 is fabricated to be a 0° polarizer. A second dual polarizer assembly is fabricated such that it is a 45° polarizer and, in other respects, is substantially identical to dual polarizer assembly 214. To fabricate an optical isolator for use with a TOSA (Transmitter Optical Subassembly), the 0° polarizer 214 and 45° polarizer 216 are attached to either side of a Faraday rotator 218 (or a garnet that rotates the polarization of a beam), as is shown in FIGS. 2C and 2D. The surfaces of the polarizers 214 and 216 that are in contact with the Faraday rotator 218 also preferably have an anti-reflective coating to prevent internal reflection.

Figure 3:
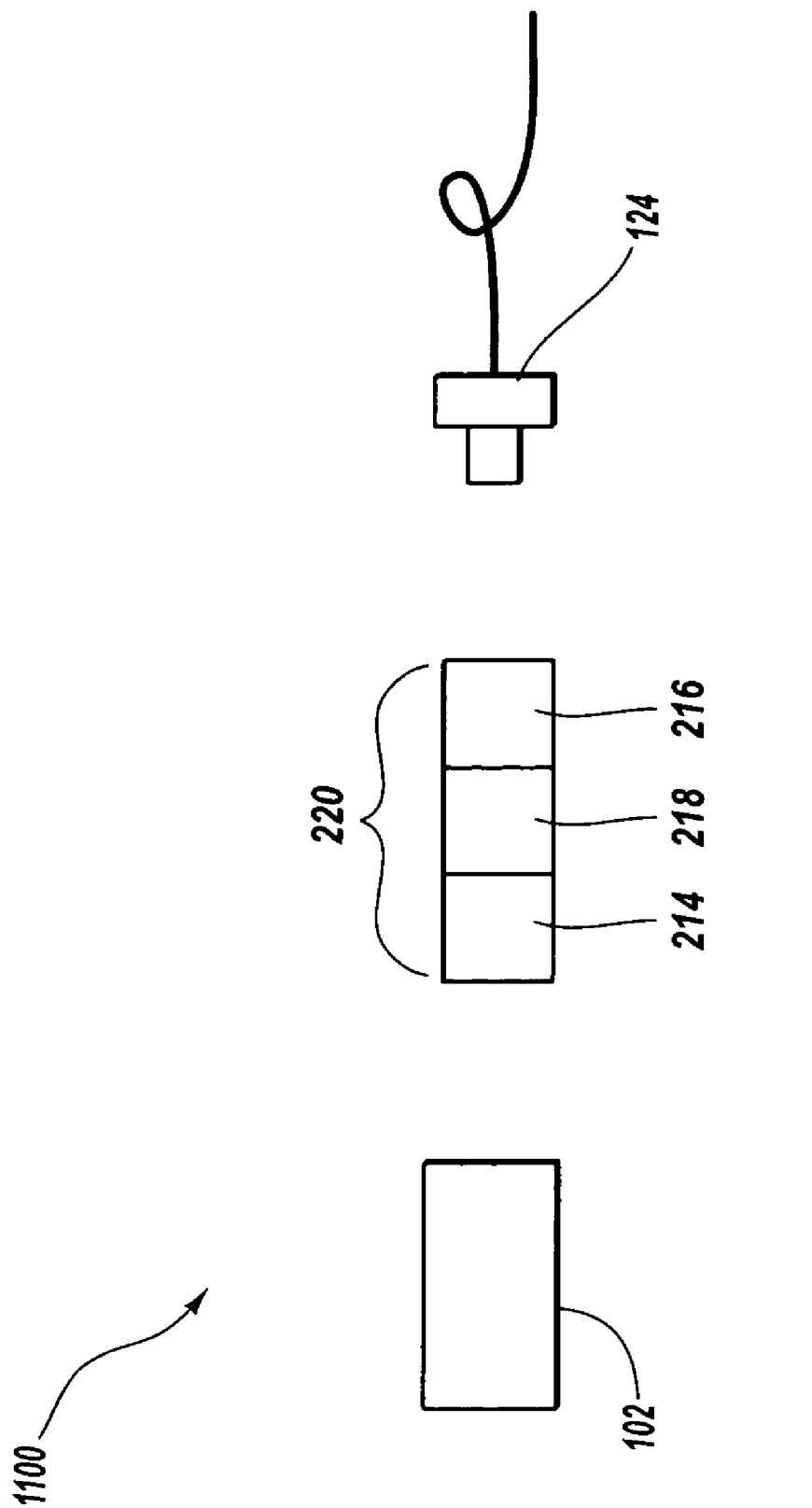
FIG. 3 illustrates an isolator configuration including one example of an efficient polarizer in accordance with one embodiment of the present invention.

FIG. 3 is a simplified diagram that illustrates a TOSA 1100 including the optical isolator 220 shown in FIG. 2D, the laser 102, and the pigtail 124, in accordance with one embodiment of the present invention.

Figure 1:
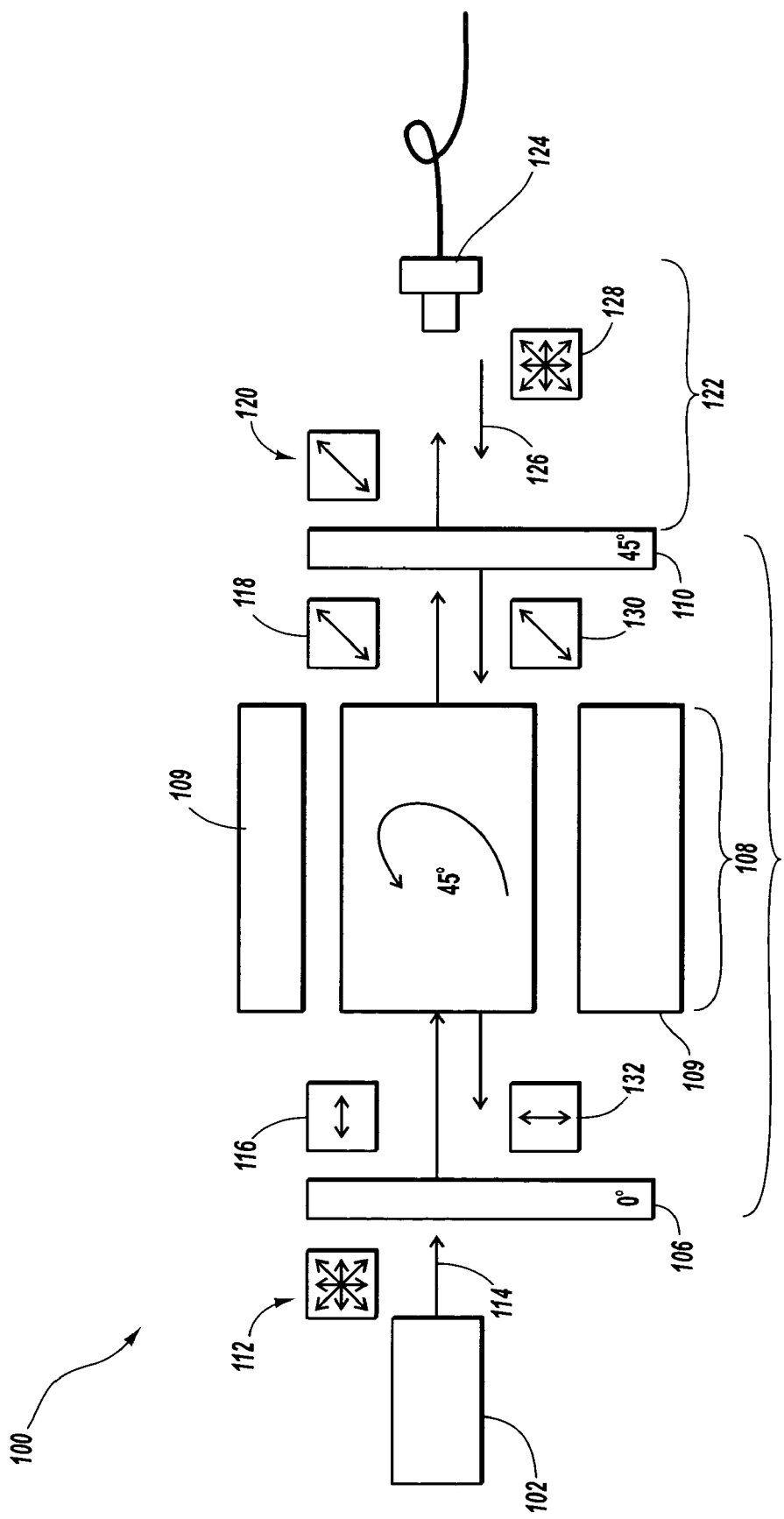
FIG. 1 illustrates a typical isolator configuration integrated into a TOSA and interfaced with a fiber-optic network.

The assembly of the two polarizers 214 and 216 combined with the Faraday rotator 218 is then diced into small optical isolators 220, as shown in FIG. 2D. The small optical isolators 220 are then installed into a magneto ring and metal housing. In the end, a finished optical isolator 220 is created that can be used with a laser in a TOSA, or similar optical component. As is common, the TOSA can have a free space air gap between one of the polarizers and the receiving end of the optical fiber (e.g., 124, FIG. 1) into which the optical signals are ultimately transmitted. In accordance with the illustrated embodiment, the inventive optical isolators 220 will have a relatively high extinction ratio that prevents back reflections that can occur due to this free space.

The present invention may be embodied in other specific forms without departing from its spirit or essential characteristics. The described embodiments are to be considered in all respects only as illustrative and not restrictive.

We claim:

1. An optical signal isolator assembly comprising:
   a discrete 0° ruled-glass polarizer assembly including two or more ruled-glass polarizers attached together in series, the two or more ruled-glass polarizers having low-grade extinction ratios;
   an optical signal rotator attached to the 0° polarizer assembly;
   a 45° ruled-glass polarizer assembly affixed to the optical signal rotator,
   wherein the 45° ruled-glass polarizer assembly includes two or more ruled-glass polarizers attached together in series, the two or more ruled-glass polarizers having low-grade extinction ratios; and
   wherein the extinction ratio of one or more of the polarizers in two or more of the polarizer assemblies is between −30 and −35 dB.

2. The optical signal isolator of claim 1, wherein the optical signal rotator is one or more of a Faraday rotator, a garnet, a latching magnetic material, and a non-latching magnetic material.

3. The optical signal isolator of claim 1, further comprising:
   a light source placed in series with the optical signal isolator; and
   a fiber optic pigtail placed in series with the optical signal isolator, the fiber optic pigtail placed on an opposite side of the light source.

4. An optical signal isolator assembly for use in an optical transmitter in a fiber-optic network environment, comprising:
   a distributed feedback laser, the laser directing an amplified optical signal in series through the optical signal isolator assembly;
   an initial polarizer assembly placed in series with the laser, the assembly including two or more polarizing plates having a low extinction ratio;
   an optical signal rotator placed in series with the initial polarizer assembly, the optical signal rotator rotating the optical signal coming from the initial polarizer by a predetermined degree;
   a discrete subsequent ruled-glass polarizer assembly placed in series with the optical signal rotator, the assembly including two or more polarizing plates having a low extinction ratio; and
   a fiber-optic receptacle placed in series with the subsequent polarizer, the fiber-optic receptacle receiving an optical signal passing through the subsequent polarizer, wherein the extinction ratio of the initial and subsequent polarizer assemblies is of a lower grade than −40 dB.

5. The optical signal isolator assembly of claim 4, wherein the optical signal rotator is one or more of a Faraday rotator, a garnet, a latching magnetic material, and a non-latching magnetic material.

6. The optical signal isolator assembly of claim 4, wherein the predetermined degree is 45°.

7. The optical signal isolator assembly of claim 6, wherein the initial polarizer assembly polarizes light at 0°, and wherein the subsequent polarizer assembly polarizes light at 45°.

8. The optical signal isolator assembly of claim 7, wherein the initial polarizer assembly comprises two or more ruled-glass polarizers assembled in series with an epoxy, the assemblies further coated with anti-reflective coating.

9. An optical signal isolator assembly for use in an optical transmitter in a fiber-optic network environment, comprising:
- a distributed feedback laser, the laser directing an amplified optical signal in series through the optical signal isolator assembly;
- an initial polarizer assembly placed in series with the laser, the assembly including two or more polarizing plates having a low extinction ratio;
- an optical signal rotator placed in series with the initial polarizer assembly, the optical signal rotator rotating the optical signal coming from the initial polarizer by a predetermined degree;
- a discrete subsequent ruled-glass polarizer assembly placed in series with the optical signal rotator, the assembly including two or more polarizing plates having a low extinction ratio;
- a fiber-optic receptacle placed in series with the subsequent polarizer, the fiber-optic receptacle receiving an optical signal passing through the subsequent polarizer;
- wherein the predetermined degree is 45°;
- wherein the initial polarizer assembly polarizes light at 0°, and wherein the subsequent polarizer assembly polarizes light at 45°;
- wherein the initial polarizer assembly comprises two or more ruled-glass polarizers assembled in series with an epoxy, the assemblies further coated with anti-reflective coating; and
- wherein the two or more ruled-glass polarizers have an extinction ratio between −30 and −35 dB.

10. The optical signal isolator of claim 1, wherein at least one of the ruled-glass polarizers comprises:
- a glass substrate having a plurality of grooves defined therein, each groove having a metal wire inserted therein;
- a covered glass layer; and
- an adhesive disposed about at least one surface of the covered glass layer.

11. The optical signal isolator of claim 10, wherein the at least one of the ruled-glass polarizers include an anti-reflective coating between the covered glass layer and the adhesive.

12. The optical signal isolator of claim 10, wherein an outer surface of the at least one of the ruled-glass polarizers includes an anti-reflective coating.

13. The optical signal isolator of claim 10, wherein the at least one of the ruled-glass polarizers is arranged such that the glass substrate is positioned on an exterior portion of the optical signal isolator assembly.

* * * * *